May 19, 1970 R. S. GREGOIRE 3,512,494

SUBMERSIBLE WATERCRAFT

Filed June 11, 1968 7 Sheets-Sheet 1

INVENTOR

R.S. Gregoire

BY Lowry & Rinehart

ATTORNEYS

May 19, 1970 R. S. GREGOIRE 3,512,494

SUBMERSIBLE WATERCRAFT

Filed June 11, 1968 7 Sheets-Sheet 2

INVENTOR

R. S. Gregoire

BY Lowry & Rinehart

ATTORNEYS

May 19, 1970 R. S. GREGOIRE 3,512,494

SUBMERSIBLE WATERCRAFT

Filed June 11, 1968 7 Sheets-Sheet 3

INVENTOR

R. S. Gregoire

BY Lowry & Rinehart

ATTORNEYS

INVENTOR
R.S. Gregoire
BY Lowry & Rinehart
ATTORNEYS

INVENTOR
R. S. Gregoire
BY Lowry & Rinehart
ATTORNEYS

INVENTOR
R. S. Gregoire

BY Lowry & Linehart

ATTORNEYS

May 19, 1970 R. S. GREGOIRE 3,512,494

SUBMERSIBLE WATERCRAFT

Filed June 11, 1968 7 Sheets-Sheet 7

INVENTOR

R. S. Gregoire

BY Lowry & Rinehart

ATTORNEYS

United States Patent Office 3,512,494

Patented May 19, 1970

3,512,494

SUBMERSIBLE WATERCRAFT

Resta S. Gregoire, Newport, Pa., assignor to Gregoire Engineering & Development Co., Adelphi, Md., a corporation of Maryland Filed June 11, 1968, Ser. No. 756,696
Int. Cl. B63b *1/10*
U.S. Cl. 114—61 5 Claims

ABSTRACT OF THE DISCLOSURE

The present invention comprises a streamlined hull of a catamaran type having a tear drop sectioned pontoon portion along each side with a horizontal substantially rectangular shaped body portion fixed between the pontoon portions, and a pair of power pods with a tear drop vertical cross section taken axially of the craft, an impeller on a shaft extending from a motor in each pod through the pointed edge at the outer end of each pod, and each pair of pods being rotatably mounted for independent angular adjustment about a horizontal axis at each end of the craft, said horizontal axis extending substantially through the radial center of the round end of the tear drop section of the pods. The impeller drive motors are independently controlled for operation in either direction so that unique maneuverability is obtainable either on or under the surface of the water by proper coordination of the speed and direction controls for the operation of the four power pods, or even if only one pair of pods are operated to provide rolling, looping speed and direction controls. The power pod and cargo and operating equipment spaces are not closed for pressurization so that the outside walls of the hull body may be comparatively light even for operation at great depths since the same pressures are effective on both sides of these walls no matter how deep the operation. The spherical or tubular personnel housing portions of the hull, occupying only a small portion of the entire hull space, will be comparatively light in structure because of the smaller dimensional requirements.

This invention relates to water borne vessels, and more particularly to a combined surface and underwater craft having a new and novel hull concept.

In present day ship and submarine construction, the function and adaptability of a vessel is strongly limited by certain fixed concepts in hull design. In the case of boats and ships, a single hull design has been used almost exclusively. In handling hull design, the marine architects have been faced with severe maximum limitations in stability, maneuverability, seaworthiness, and speed per unit of horsepower. In some naval vessels, for example, as in destroyers, it has been necessary to sacrifice stability in order to obtain high speed without excessive horsepower. In battle maneuvering, in a tight turn at high speed, the ship hull will skid through the water a substantial distance. The resultant path, therefore, is a rather wide arc, and in ship or boat handling great care and skill is required to make allowance for this side slip. There is also a problem of heavy list in tight turns.

In the case of a small craft, the application of very high horsepower to a boat of relatively small size has created difficult problems, including those of stability during straight forward motion, skid or overturn on tight turns, and swamping of the boat by the shipping of water.

In the case of submersible craft, design has heretofore been limited to a single hull. The function of the craft has been severly limited and has been restricted largely to naval warfare and scientific explorations and research. They have been of little value as cargo carriers because of problems of cargo loading and unloading and also of stability. Submarines have limited value in underwater operations since access and egress while the craft is under water has been limited to small ports or air locks and involves only the passage of divers and weapons, such as torpedoes and rockets.

Designers of modern high speed submarines have in particular faced problems in propulsion and maneuverability. Depth control can no longer be achieved by the intake or ejection of water ballast. Speed is so great that the depth and direction are controlled by rudders and elevators, in a manner similar to aircraft control. Avoidance of underwater obstructions is a substantial problem. Intelligence on these obstructions may be obtained only from instruments, and the craft must be capable of a rapid maneuver to effect a change of course so as to evade the obstruction. Again, side-slip, directional inertia and the like require the exercise of great skill and care in the handling of a submarine while it is travelling submerged. In this case, limited maneuverability is only achieved when there is sufficient forward speed so that control elements will respond. Present rudders and elevators are not fully effective at high speeds, because the momentum of the craft in relation to the control surface area is of such magnitude that there is a dangerous lag between the manipulation of the control elements and the resultant response of the craft. This has been one of the serious design problems in the advanced nuclear submarines.

It is an object of the present invention to create a new ship or boat hull design which is easily adapted to a great diversity of use while using only a single hull design with carefully calculated performance characteristics.

Still another object of the invention is to provide a new and novel water craft which is equally usable as a surface craft alone, as a submersible craft, or as a combined surface and submersible craft.

A further object of the invention is to provide a craft which is adaptable for propulsion by the air blister principle, which may be with the application of suitable air lift equipment, used as an air borne vehicle, or which may be constructed as a combination water craft and air vehicle.

Another object of the invention is to provide a basic water craft design which is adaptable for either large ships or small boats, or any desired intermediate type.

Still another object of the invention is to provide a basic water craft design which is capable of exceptional maneuverability while at the same time it is possessed of exceptional stability.

A further object of the invention is to provide a water craft which on the water surface is capable of turning within the length of the vessel to completely reverse its direction of travel, or capable of executing perfect ninety degree angle turns while the vessel is under power up to the maximum recommended horsepower, the list during these maneuvers not being over ten degrees.

Another object of the invention is to provide a vessel which under water is capable of executing perfect ninety degree angle turns or making a complete turn within its own length to reverse its direction of travel, the hull listing not being over ten degrees.

Still another object of the invention is to provide a water craft design of submersible type which is capable of surfacing from under the water or submerging from the top of the water on the true vertical line while the deck of the vessel remains on a true horizontal plane.

A further object of the invention is to provide a submersible vessel which is capable while submerged of turning in a complete inside or outside loop-the-loop within a circle, the diameter of which is equal to the overall length of the hull.

Still another object of the invention is to provide a vessel which is capable of doing a complete starboard or portside roll-over for a full 360 degrees within a circle whose diameter is equal to the total width to the hull, this rollover motion being obtainable while the vessel is in a forward or reverse movement, horizontal movement, vertical movement, or at any longitudinal degree of movement therebetween, or while there is no forward or reverse movement, vertical movement, horizontal movement, or any longitudinal degree therebetween.

A further object of the invention is to provide a novel water craft which is capable of braking while submerged or on the surface to a relatively fast stop, thus avoiding appreciable continued momentum after the power in the vessel has been cut off.

A further object of the invention is to provide a novel water craft design which is capable of hovering on the surface or under the water, regardless of currents, tides or waves which may be exerting substantial forces on the vessel.

Yet another object of the invention is to provide a vessel wherein the surfacing motion or the submerging motion can be converted in the craft after the hull has been rolled over to any degree of the 360 degree turn, so that the vessel will turn off at a full ninety degrees from any position in which the deck rests; and wherein the vessel is capable of doing the inside or outside loop-the-loop from any degree within the 360 degree roll-over, so that every motion, namely surfacing, submerging, loop-the-loop, inside or outside loop, or rollover to the port or starboard, can be varied in any combination of motions to permit all motions to any degree within a circle, the diameter of which is equivalent to the overall length of the hull.

A further object of the invention is to provide a basic water craft design wherein a versatile, functional structure is supported and confined between two pontoons which are preferably of a tear drop shape, as shown in the present drawings, but which, if desired, could be modified to other cross-sectional shapes, these pontoons serving as the buoyant portion of the structure, the air space of the pontoon being totally separate and independent from the air space in the central structure.

Still another object of the invention is to provide a vessel wherein the central hull structure between the pontoons can be filled with water or emptied of water, as desired, while surfaced or submerged, without affecting the basic buoyancy or operativeness of the vessel; and wherein the central hull structure can be opened from the bottom or can be opened from the top while submerged or afloat, or wherein the said central hull can be closed and sealed and the water pumped therefrom to maintain a pressurized water-free area.

Still another object is to provide a water craft structure wherein it is possible to surface the craft in any position, whether it be upside down, right side up, or on its side, thus permitting selective surfacing of the exterior of the hull, for repairs or maintenance, including painting, without removing the vessel from the water, or without using drydock facilities.

Yet another object of the invention is to provide a water craft which is powered by power pods, there being two forward and two aft pods, the said pods being self-contained for propulsion and control and each having a self-contained power plant, this making it possible in the event of individual power plant failure to lift off or drop the defective pod, a new pod being installed while the vessel is still in the water and without dock or drydock facilities.

Another object of the invention is to provide a basic water craft design which has wide commercial and military application, being adaptable to passenger transport, cargo transport, surface and underwater fishing, underwater mining for lake and ocean floor mineral deposits, repair and servicing of submarine cables, planting and servicing of underwater mines, planting and servicing of underwater defense installations, missile launching, submarine chasing, underwater demolition, and the like.

With the above and other objects in view, as will be presently apparent, the invention consists in general of certain novel details of construction and combinations of parts hereinafter fully described, illustrated in the accompanying drawings, and particularly claimed.

In the drawings, like characters of reference indicate like parts in the several views, and FIG. 1 is a perspective view of one form of the invention wherein the central hull comprises a closed chamber, and disclosing the basic relationship of spaced pontoons, and center hull structure, and power pod propulsion;

Figures 1, 2, 3, 4, 27:
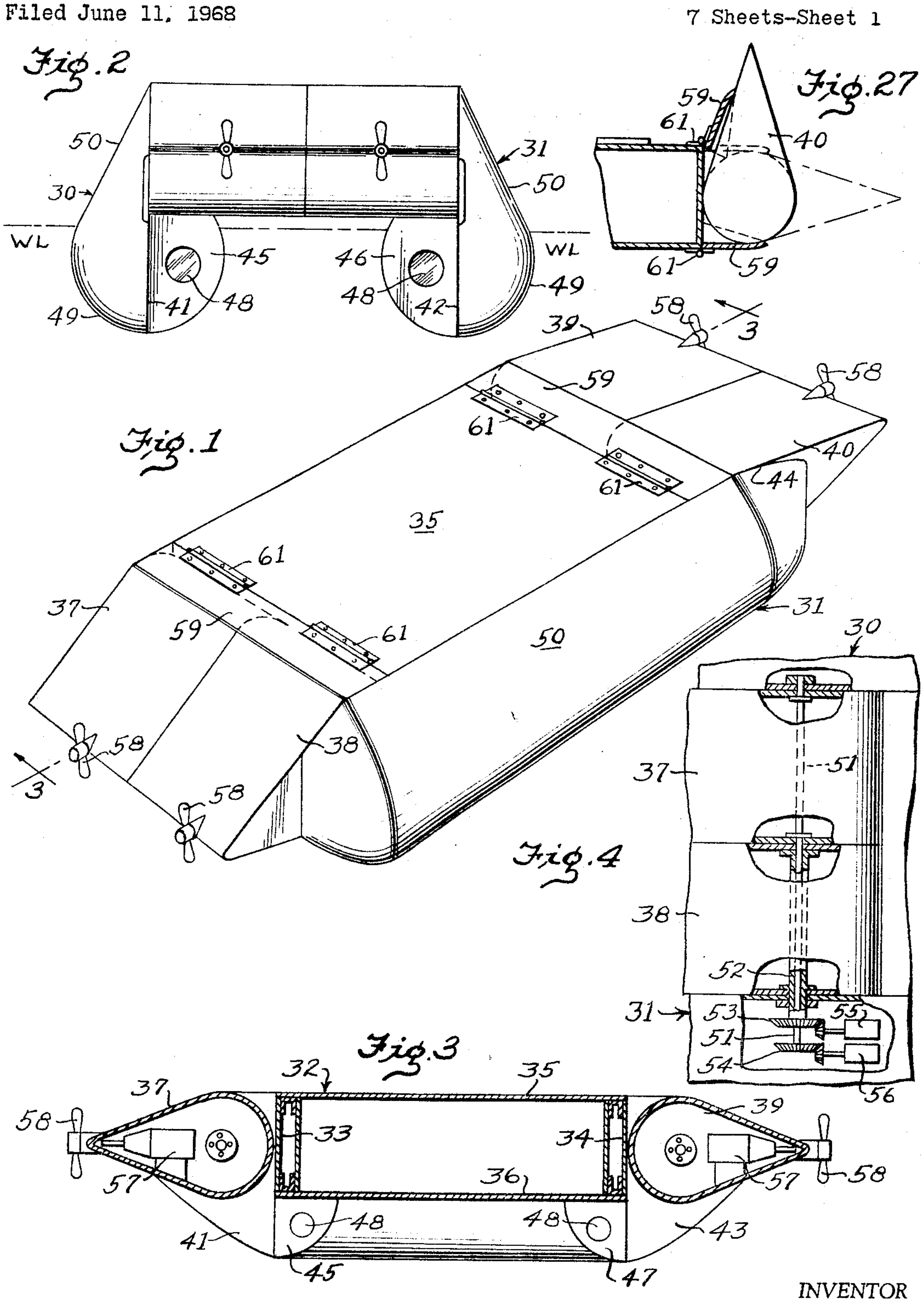
FIG. 2 is a front elevational view of the water craft as shown in FIG. 1.
FIG. 3 is a longitudinal section taken on the line 3—3 of FIG. 1.
FIG. 4 is a fragmentary view, partly broken away, of a part of the power pod and hull structure, and showing one form of power control for the angle of the power pods.
Figure 26:
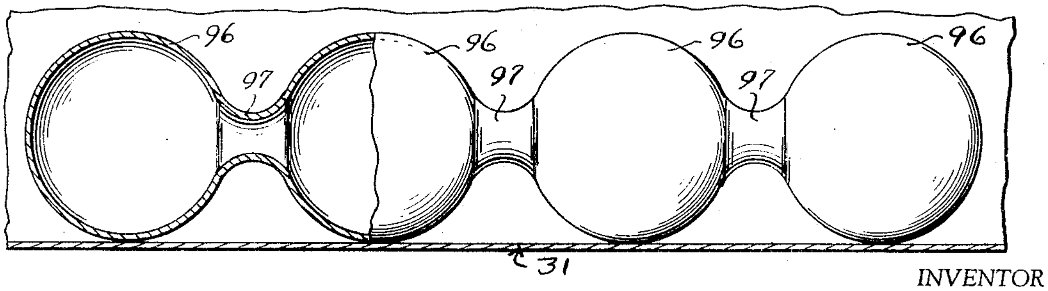

FIG. 26 is a fragmentary view, partly broken away, showing a pressure capsule for the pontoon structure, which pressure capsule is designed for maximum depth; and FIG. 27 is a fragmentary view showing the spring-biased guardplates which cover the openings between the central hull and the inner ends of the power pods, and showing the manner in which the plates pivot to permit the power pods to take their maximum angular position.

It will be appreciated that in the drawings, for purposes of clear and uncluttered disclosure of the essential and important characteristics of the invention, many of the structural details not essential to the inventive concepts involved have been simplified or have not been shown. For example, much of the truss and framing detail has been omitted. Power plants have been shown in highly schematic form, and highly detailed standard structure which would be housed in the pontoons to provide a normally operative submersive craft has not been shown.

BASIC HULL DESIGN

The hull assembly in its basic form is shown in FIGS. 1, 2, 3, 4 and 27 of the drawings.

The craft comprises a pair of catamaran-type pontoons 30 and 31. Except where the shape is broken for the insertion of other structure, these pontoons are tear drop shaped in cross-section. This cross-sectional shape is highly significant to the performance of the craft.

Extending between the pontoons 30 and 31 is a central hull section 32 which is generally rectangular in shape. The central hull section is rigidly connected to the pontoons and will possess the necessary frame and truss structure to meet the stresses to which the craft will be subjected, depending upon the size of the craft. This may vary widely, and for simplification of disclosure these details have not been shown. This central hull section is provided with end walls 33 and 34, top deck 35 and bottom deck 36. This deck area will be provided with the necessary seals to render it water and air tight, and the necessary hinges, locking mechanisms and devices for fastening and opening the said decks.

Control and propulsion of the craft is provided by four power pods 37, 38, 39 and 40. Each of these power pods is preferably tear drop shaped in cross-section, as shown in FIG. 3. The axis of the tear drop is preferably substantially in line with a longitudinal plane through the midpoint of the midsection hull 32. The inner end of each power pod is preferably an arc of a true circle so that the pods may pivot to full range. The upper and lower faces of the pods provide control surfaces which operate in a manner to be described.

Figures 17, 18:
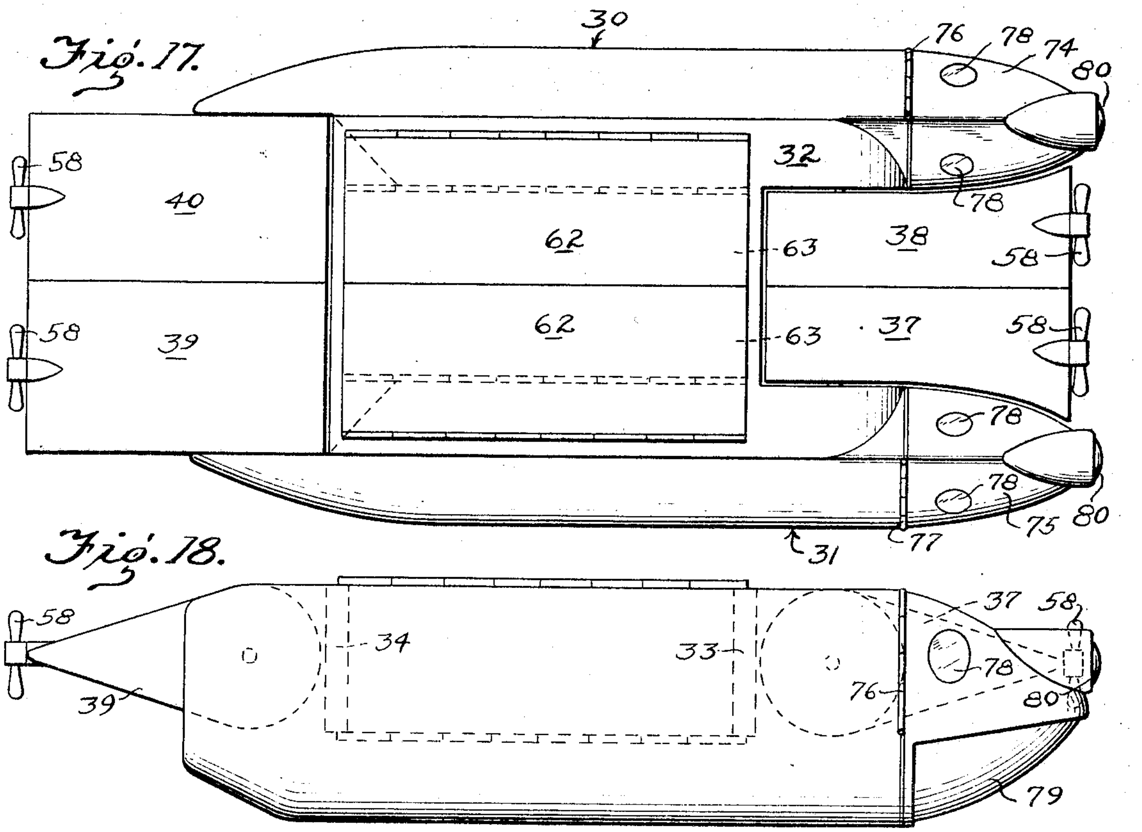
FIG. 17 is a top plan view of a modification of the basic design which is particularly adapted for use as a demolition vessel or as a submarine chaser.
FIG. 18 is a side elevational view of the modification shown in FIG. 17.

Each of the pontoons fore and aft is cut away as at 41, 42, 43 and 44 to provide for reception of the power pod structure, defining a flat surface so that the said power pods may pivot through their full range without interference from the hull, or the power pods may have their exterior vertical faces curved to conform to the curvature of the pontoons, as shown in the forward power pods 37 and 38 in FIG. 17.

The transition portions on the pontoon hull from the flat surfaces 41, 42, 43 and 44 to the full tear drop shape are rounded to reduce water turbulence and resistance. These are shown at 45, 46 and 47. Each of these surfaces may be provided with a port 48. The ports 48 may serve as torpedo tube openings, or may function as inlet or outlet openings for water ballast.

It will be noted that the cross-sectional shape of the pontoons 30 and 31 includes an arcuate base curve 49 which is preferably a segment of a true circle. Straight portions or side curves 50 are tangent to the arc 49.

For improved operation and proper balance and stability, it has been found that the craft is preferably designed so that its water line, when the craft is surfaced, under normal operating load, falls at the point of tangency of the straight portions 50 to the arcuate base 49.

In its preferred form, it has been found that the tangent line 50 should intersect the arc 49 at an angle of not less than 70 degrees or more than 80 degrees from the horizontal. Further, the bottom deck 36 of the central hull section must be spaced upwardly from the water line, or, to put it another way, spaced upwardly from the point of tangency of the pontoon hull cross-section.

It should be noted at this point that the invention is not limited to the precise hull shape shown. If, for reasons of pressure resistance, it should be desired that the side portions 50 have some curvature, then a theoretical mean taken through this curve of the hull should conform to the relationship set forth above for the straight portion 50. In this case, the bottom deck 36 would be spaced above the intersection of the side wall curve and the arcuate base curve. The basic relationship may exist, therefore, even though variations may be made in the hull detail in designing for various conditions. Expressed generically, planes taken through the mean of the upper side curves of the tear drop shape would intersect the plane taken through the intersection of the upper side curves and the lower base curve at an angle of no less than 70 degrees or more than 80 degrees. It may be pointed out that in the mathematical sciences, a straight line is considered a curve of infinite radius.

The reason for these preferred relationships is that when the craft is put hard about, the forces on the straight portions 50 will force the craft down, increasing the displacement to the degree that the bottom of the deck will come into substantial contact with the normal surface of the water.

The distance of the bottom deck 36 from a line through the points of tangency can be varied within certain limits, depending upon the angle of the straight portions 50 to the horizontal. The distance may be decreased as the angle of the straight portion 50 increases.

Each of the power pods 37, 38, 39 and 40 is pivotally attached to the hull structure, the important aspect of the mounting being that each pod be capable of pivoting a full 90 degrees in either direction from the normal position of the pod in line with the hull structure, each independent of the other. Various means may be used for pivotally mounting and controlling the pods. One simplified, somewhat schematic, but operational arrangement is shown in FIG. 4.

In FIG. 4 the shaft 51 extends from the pontoon 30 to the pontoon 31 through the pods 37 and 38, being mounted in suitable bearings. The power pod 37 is rigidly attached to the shaft 51, and will turn when the shaft is turned. A second shaft 52 is concentric to the shaft 51 and is rotatable thereon. The power pod 38 is rigidly secured to the shaft 52, so as to turn therewith. The shaft 51 is provided with a drive gear 54, and the shaft 52 is provided with a drive gear 53. Suitable power means, such as motors 55 and 56, is provided to rotate the drive gears and separately and independently adjust the angle of the pontoons. These motors may be tied in with a suitable guidance and control system not forming a part of the present invention. Other means may be provided to power and fix the position of the pods.

Each of the power pods is provided with a suitable self-contained power unit 57. These units 57 drive suitable propellers 58. For the purpose of the present invention, it is necessary that the power units supply maximum power in either forward or reverse direction. The details of the power unit do not form a part of the present invention. These units should be capable of supplying their own combustion oxygen, and disposing of their products of combustion under water. If desired, jet nozzles may be used in place of the propellers, with a suitable arrangement to change the direction of thrust of said nozzles on the forward pods.

While the opening between the end walls 33 and 34 and curved inner ends of the power pods may be left open, if desired, as shown in FIG. 3, the said openings are preferably covered by protective guard plates 59, as shown in FIGS. 1 and 27. The plates 59 have downwardly curved leading edges 60 and are supported on the central hull section 32 by spring hinges 61. These spring hinges continually bias the plates 59 into contact with the power pods. These plates, however, as shown in FIG. 27, permit full range angular positioning of the pods, since they pivot with the pods. These plates 59 exclude solid matter from the openings between the hull and the pods, and reduce turbulence.

The power pods 37, 38, 39 and 40 are designed for powering and control of the craft while submerged. For low speed, surface travel, suitable low-powered auxiliary drive means may be provided. This could be in the nature of a screw on a depending shaft from the power pods or a battery powered drive screw on the pontoons. This auxiliary drive means has not been shown.

PROPULSION AND MANEUVERABILITY OF THE CRAFT

FIGS. 5 through 12 of the drawings are schematic views showing the various maneuvers of which the craft is capable. It should be pointed out that the full range of these maneuvers is made possible by the remarkable balance and stability of the full design due to the characteristics and structure previously described.

Figure 5:
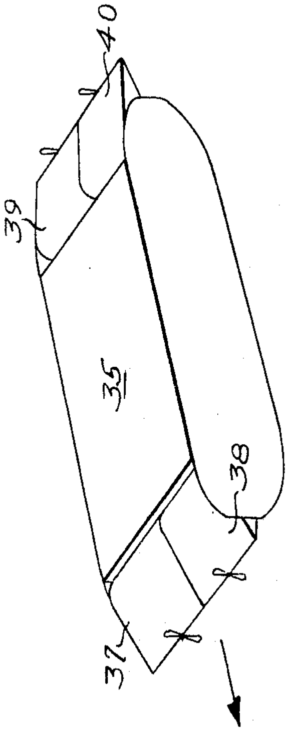

In FIG. 5 there is shown the position of the power pods to obtain a balanced forward motion while submerged, the aft propellers functioning as pushing screws and the forward propellers functioning as pulling screws. All four propellers 58 being of a revesible nature, and the positioning of the power pods being independent of each other, it is possible to yawl the craft through the use of the propellers and power pods without the use of a rudder underneath the structure.

Figure 6:
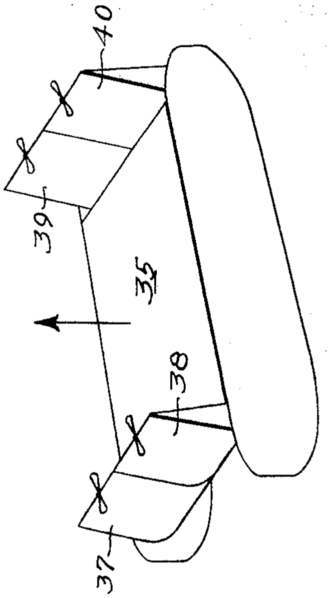
FIGS. 5 through 12 are schematic perspective views of the water craft showing the angular positions of the power pods for various selected maneuvers of the craft.

FIG. 6 shows the power pods in raised position, as might be applied to surfacing the craft. In this position, the propellers on power pods 37, 38, 39 and 40 are turning in a direction to exert a pulling thrust. Thus, the craft would surface in the direction of the arrow, with the deck remaining on a true horizontal plane. With the craft submerged, if the propellers are rotating so as to exert a forward thrust or push, the craft would submerge further in a direction opposite to the arrow, with the deck on a horizontal plane.

Figure 7:
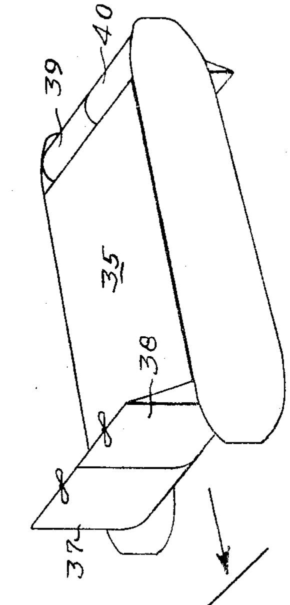

In FIG. 7, the forward power pods 37 and 38 are shown as raised in a position so that the plane of the undersurface of each power pod is at an angle of 90 degrees to the deck 35. The aft power pods 39 and 40 are down to a position where the bottom plane of each of these power pods is at an angle of 90 degrees to the bottom deck 36. In this position, the power pods offer a barrier to develop maximum resistance to forward motion. Thus, with the power cut off prior to or during the placement of the power pods in this position, the forward momentum of the craft will be considerably reduced, braking the craft to a faster stop than would be found in conventional hulls.

Figure 8:
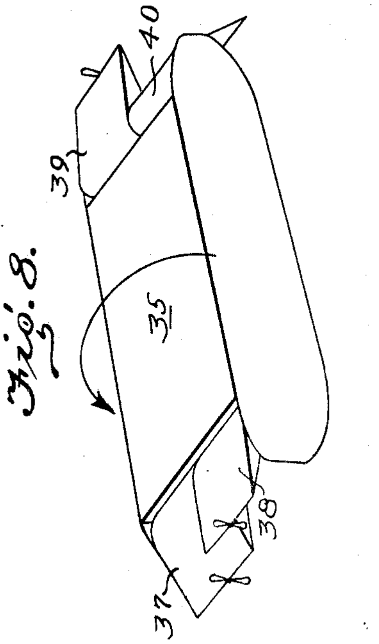

In FIG. 8, with the forward power pod 37 in true center alignment with the central hull section 32, with the power pod 38 raised, with the power pod 39 in true center alignment with the central hull section 32, with the power pod 40 lowered, and with all four propellers operating so as to produce forward pull or thrust, respectively, the craft will advance forward, at the same time doing a complete roll-over of 360 degrees to the port side. Reversing the propellers while this relationship exists will cause the craft to back up and roll a full 360 degrees to the starboard side.

Figure 9:
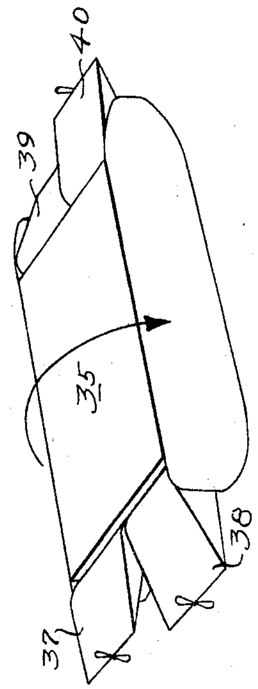

In FIG. 9, power pod 37 is shown as raised, and pod 38 is in true center alignment with the central hull section 32. Aft power pod 40 is shown in true center alignment with the central hull section 32, and power pod 39 is lowered. Thus, with all propellers operating for forward pull or thrust, respectively, the craft will roll over a full 360 degrees to the starboard side in forward motion. Reversing the propellers on all four power pods while the pods remain in this position will result in the craft reversing its direction of travel and rolling over a full 360 degrees to the port side.

It should be emphasized, relative to FIGS. 8 and 9, that the angular position of the power pods will determine the speed of roll-over in relation to forward motion. For example, the roll-over may take place slowly in a considerable distance of forward motion. Or, the forward motion may be stopped and the roll-over accomplished without any forward movement.

Figure 10:
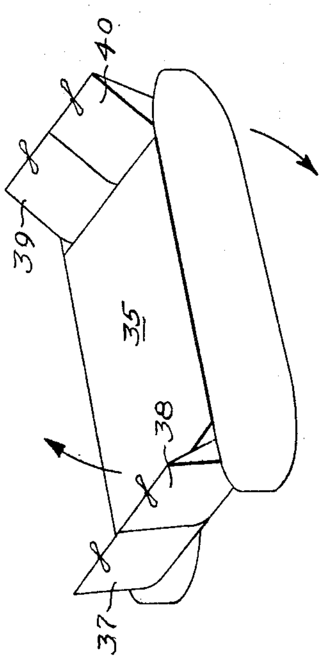

In FIG. 10, with the forward power pods 37 and 38 raised, with the aft power pods 39 and 40 raised, with the forward propellers exerting a pull and the aft propellers exerting a thrust, the craft will do an inside loop-the-loop within a circle the diameter of which is equal to the length of the hull. Reversing the direction of rotation of the propellers while the power pods are in the position thus desecribed will result in an inside loop-the-loop in the opposite direction. The degree of angle in the position of the power pods will determine the diameter of the loop.

Figure 11:
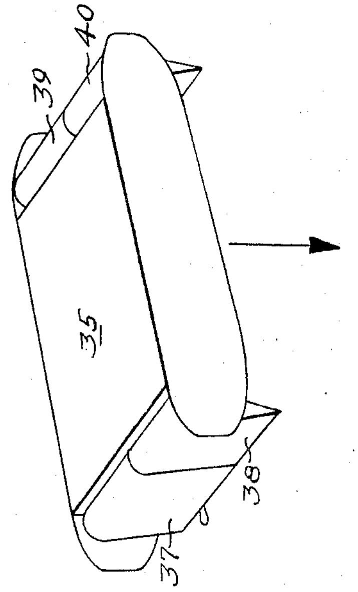

In FIG. 11, with the forward and aft power pods all turned down, and with all propellers 58 operating to exert a pull downward, the craft will submerge with the deck 35 remaining on a true horizontal plane. By reversing the propellers 58 to exert a push upwardly, the craft will surface with the deck 35 remaining in a true horizontal plane.

Figure 12:
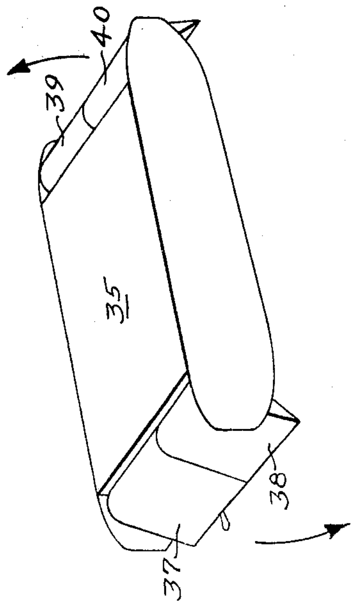

In FIG. 12, with the forward and aft power pods turned down, with the forward propellers exerting a pull and the aft propellers exerting a thrust, the craft will do an outside loop-the-loop in a forward direction within a circle the diameter of which is equal to the overall length of the hull. By reversing the propellers while the power pods are in this position, the craft will do an outside loop-the-loop in reverse. Again, the degree of angle in the position of the power pods will determine the diameter of the loop.

With all of the maneuvers above described available, should it be desired to hover the craft over a given spot at sea, even in strong currents, the hovering position can be maintained through manipulation of the power pods to a proper position where in combination with the selective forward or reverse capability of the power pods individually, a compensation can be made for currents so as to stabilize the said hoverig position. Further, since all of the motions heretofore described are available, it is possible to turn the hull of the craft any angle or any degree from a horizontal yawling position to any degree within a sphere, the sphere being equal in diameter to the length of the hull. With motions available as outlined in FIG. 8 or 9, it is possible to roll the hull to the port or starboard side to any degree and then immediately reposition the powere pods as in FIGS. 6 and 11 to cause the craft to move off at a ninety degree angle from the longitudinal center line of the craft.

CENTRAL HULL SECTION

Figure 13:
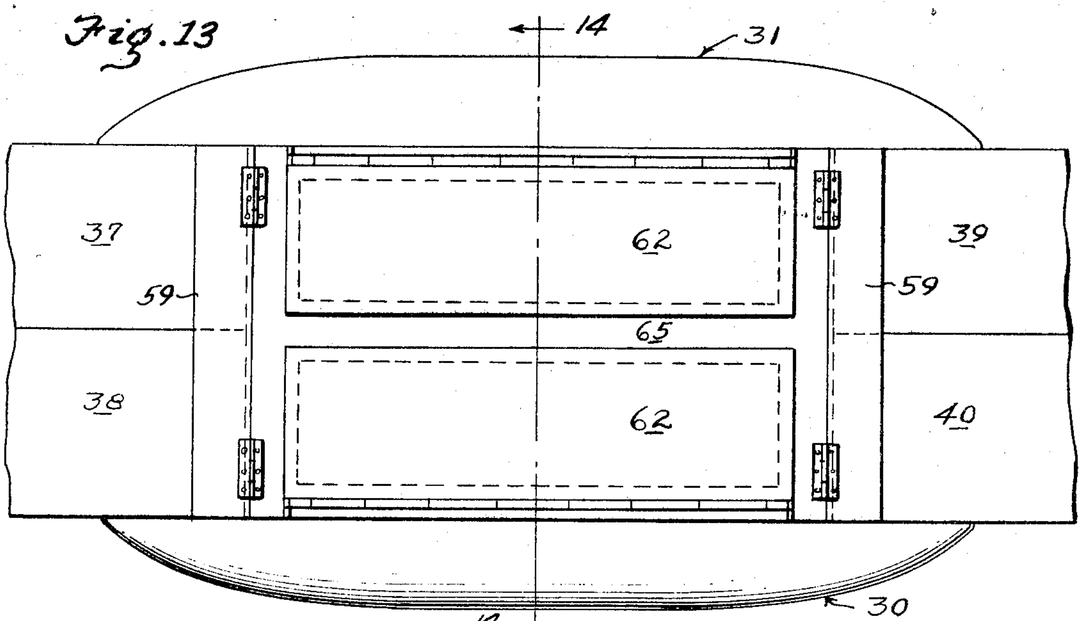
FIG. 13 is a fragmentary view of a modification of the water craft wherein the central hull structure is provided with top and bottom hatches which may be selectively opened or closed.
Figure 14:
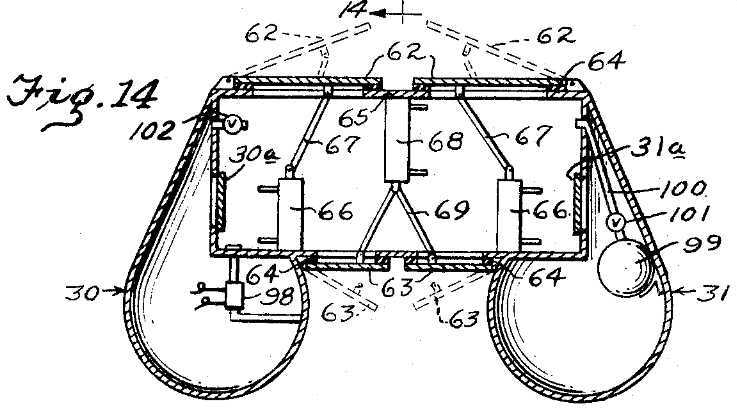
FIG. 14 is a cross-sectional view taken on the line 14—14 of FIG. 13.
Figure 15:
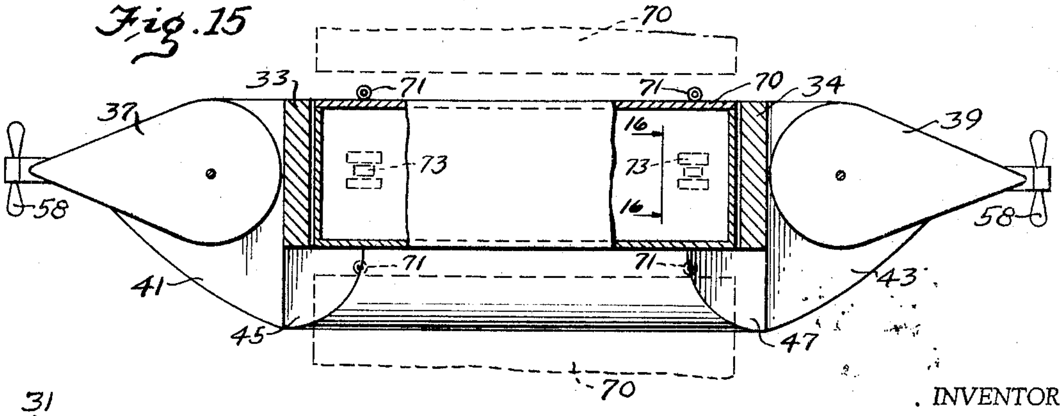
FIG. 15 is a longitudinal sectional view showing a modification of the water craft wherein the central hull portion is constructed to receive a removable unit, which may be removed upwardly or downwardly from its carrying position in the central hull structure.
Figure 16:
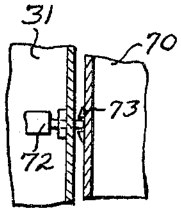
FIG. 16 is a fragmentary view showing one form of locking means for fixing the removable unit of FIG. 15 in its place in the central hull structure.

It will be seen from the disclosure, and particularly FIGS. 13, 14 and 15 that the central hull section is capable of wide variations in structure without affecting the basic hull design, maneuverability and stability of the craft.

In FIGS. 13 and 14, there is shown a modification wherein the central hull section 32 is provided with hinged top hatches 62 and hinged bottom hatches 63. These hatches are provided with suitable seals 64 to maintain the central hull section air and water tight, when desired. The hatch and seal structure is shown in simplified form, and in an operational craft this would be designed to the size and requirements of the craft. If desired, the center strip 65 could be eliminated so that a hatch of substantially the entire deck area could be obtained.

In this modification, various power means may be provided to operate the hatches 62 and 63. One possible operative form is to provide hydraulic cylinders 66 and links 67 to operate the top hatches, while hydraulic cylinders 68 and links 69 are used to operate the bottom hatches 63. The hydraulic cylinders 66 and 68 may be connected to any hydraulic control source.

It may be pointed out that the pontoons 30 and 31 will contain all of the necessary structure, intelligence and control equipment necessary to operate the submerged craft. This will include living facilities, air supply and purifying equipment, sources of light and heat, water and solid ballast, escape means and the like. These involve details some of which are well known in the art and do not form a part of the present invention as disclosed.

It should be emphasized that the pontoon sections of the hull are separate and distinct from the central hull section. Access means is provided in the form of sealed hatches or ports, such as 30*a* or 31*a*, FIG. 14, whereby personnel in the pontoon sections of the hull may pass through the central hull section 32. These hatchways will be sealed, and it is thus possible, when submerged, to flood the central hull section with water without destroying the basic operative buoyancy of the craft or without harm to the personnel in the pontoon sections.

Pump means, such as a reversible pump 98, may be provided for selectively admitting water to the central hull section or pumping water therefrom. For admitting air to the central hull section, a compressed air storage tank 99 may be connected to the central hull section by a conduit 100, the conduit being provided with a control valve 101. A suitable relief valve 102 is shown, to provide selective release of air from the central hull section into the pontoon 30 when water is pumped in, conserving the total air supply.

The central hull section therefore provides a cargo area which can be opened completely to the air when the craft is surfaced, or to the sea when submerged, and the bottom of this area can be opened completely to the sea when the craft is surfaced or when the craft is submerged. The deck area and the pod area can be opened completely to the sea. Thus, with this free area, the craft has the capability of carrying additional personnel to assist in demolition work or for reconnaissance behind enemy lines. It has the capability of carrying demolition cargo, torpedoes, rockets, detection systems equipment, or it may be put to other uses, as desired, in any given military or naval operation. The cargo area is completely independent of the power pods and pontoons, in function and use.

In certain applications, depending upon the type of propulsion unit, it might be desirable to use the cargo area as an added fuel area for certain types of propulsion units, in order to extend their range. In one particular design of craft, seventeen feet, five inches long, seven feet wide, and forty-one inches high, calculations have proven that with existing available power units, 400 usable horsepower can be applied to this craft for use through a range of one day at maximum ocean depth. Due to the size of the craft, this high horsepower would not be necessary to obtain the speed sought, namely, 40 to 50 knots maximum. In the case of conversion of this craft to a torpedo or guided missile vessel, unmanned, where control is obtained either by a tracking device or a taping program device, the maximum horsepower of 400 can be placed in the unit with the result of speeds in excess of 50 knots, with longer range and time, and with automatic start and stop characteristics.

A further modification of the central hull structure is shown in FIG. 15. In this case, a rectangular through opening or well defined by the end walls 33 and 34 and by the side walls is provided. Access to this well may be had from either the top or bottom of the hull. A separate sealed cargo box or cell 70 is provided of a size to fit closely into the rectangular opening. This box is provided with hoisting eyes 71 so that it may be lifted, if desired, by the well known hoist crane. In each of the pontoons 30 and 31, there are provided a plurality of locking dogs 72. These are selectively retractable and cooperate with correspondingly positioned dogs sockets 73 in the side walls of the sealed cargo box 70.

It will be seen that this modification of the invention offers many possibilities for varied use. When the cargo box or cell 70 is being carried, it is locked in place in the hull structure by means of the locking dogs 72. If it is desired to unload the cargo box, dockside, the dogs may be released and the hoisting crane may then lift the box 70 completely out of the rectangular opening. If desired, the craft may be submerged, the locking dogs released, and the cargo box permitted to float to the surface. If it is desired to plant a non-buoyant cargo box in shallow water, the dogs can be released and the cargo box permitted to drop to the bottom below the craft. Conversely, it is possible to load a buoyant cargo box without dockside facilities. A buoyant cargo box can be floated on the surface, the craft submerged, moved into position beneath the box, and then raised to permit the cargo box 70 to slide into the rectangular opening.

The arrangement of this modification presents great versatility for both military and commercial application. An entire cargo can be handled as a separate unit, without unduly tying up the vessel or dockside operations. Hence, this modification presents extreme utility in certain military and naval operations where dock facilities are not available and where maximum secrecy of the operation is desired.

Figure 19:
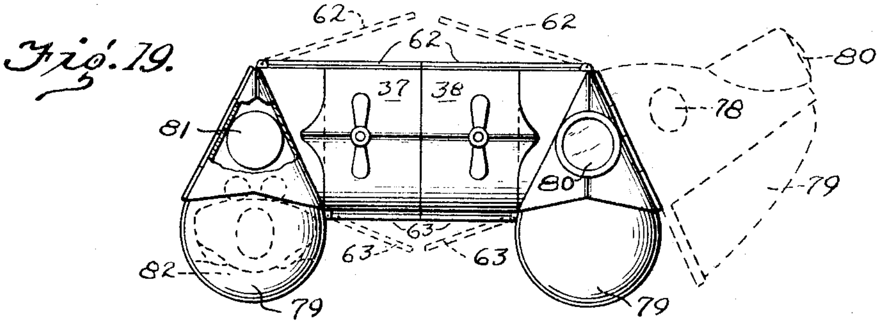
FIG. 19 is a front elevational view, partly broken away, of the demolition unit shown in FIGS. 17 and 18, the dotted lines structure showing the manner of opening of the top and bottom hatches and the manner in which the nose portions of the pontoons may be open and hinged to the side to permit entrance or exit of a person carried in the pontoon.
Figure 20:
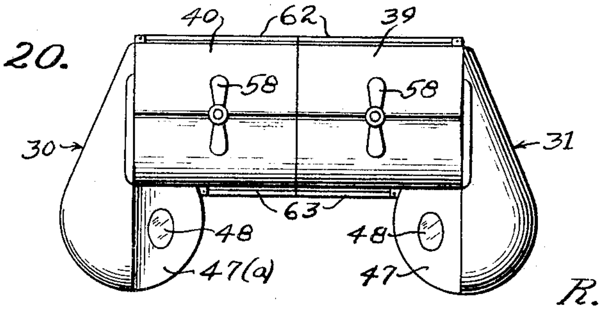
FIG. 20 is a rear elevational view of the modfication shown in FIGS. 17 and 18.

FIGS. 17, 18, 19 and 20 show a modification of the craft which has particular adaptability as a naval demolition unit or submarine chaser. In this case, the forward portions of the pontoon sections are not cut away to receive the power pods, but the forward power pods 37 and 38 are made smaller than in the previously shown form and are curved to conform to the shape of the pontoon structure. The nose portions of the pontoon sections extend further forward than in the earlier shown modification and are symmetrically shaped for maximum streamlined efficiency. It will be noted that the nose portions 74 and 75 of the pontoons are separable from the main pontoon sections 30 and 31, respectively. The nose portion 74 is hingedly connected to the pontoon section 30 by means of the hinge 76 so that it may be swung upwardly about the hinge, as shown in FIG. 19. In like manner, the nose portion 75 is hingedly connected to the pontoon section 31 by means of the hinge 77. Suitable sealing and clamping means will be provided so that the nose portions 74 and 75 are rigidly secured in closed position. The nose portions 74 and 75 are provided with observation windows 78 on opposite sides thereof and downwardly directed observation windows 79. These observation windows may be modified according to the pressures at which the craft is designed to operate. As in the previously disclosed modifications, there is a central hull section 32 and the end walls 33 and 34 define a central cargo area. This cargo area is provided with top hatches 62 and bottom hatches 63, as shown. Each of the nose portions 74 and 75 may be provided with a light 80 so that strong beams may be projected ahead of the craft during the operation thereof. Each of the pontoons 31 in the upper section thereof preferably carries a tank 81 which provides an air supply for recharging the scuba gear with which each of the operating personnel in the craft will be provided.

In the use of this modification of the craft, it will be noted that the pontoons 30 and 31 are so sized as to each receive a man lying at full length on a suitable pad 82. Each of the men will be dressed in full scuba diving equipment. Normally, an air supply will be provided with the necessary controls so that a normal operating pressure can be maintained within the sealed pontoon structures. Means will be provided for replacement of fresh air or for escape of used air. Under certain desired operating conditions, the craft can move submerged to any given point. The operator in one of the pontoons perfects his scuba equipment, connecting himself to the mouthpiece of his scuba air supply. Air is then released from the pontoon, and water allowed to enter until pressures in the pontoon are equalized with the outside water pressure. The forward nose portion 74 or 75 can then be released and swung outwardly about the hinge 76 or 77. The operator may then escape from the pontoon for reconnaissance work or to accomplish a demolition objective and then return to his previous position in the pontoon, closing and locking the nose portion. Air is then allowed to enter into the pontoon, forcing out the water, and pressure is then brought back to normal breathing conditions.

An instrument panel for a manned vessel of this type may be installed within the hinged nose section, and such instrument panel placed at a convenient angle to the operator. Food, water and other sanitary facilities may also be provided. As pointed out in connection with the basic craft, the central hull section may be used to carry additional demolition personnel, suitable scuba equipment, demolition cargo, explosives and the like. The cargo hatches 62 or 63 may be opened while the craft is submerged, and access may be had to the equipment while submerged without surfacing the craft for exposure to enemy identification. It is estimated that with this particular type of craft, dependent upon the type of power source used, personnel would be able to stay at sea for periods of time up to one month, coming to the surface periodically for an exercise period.

Figure 21:
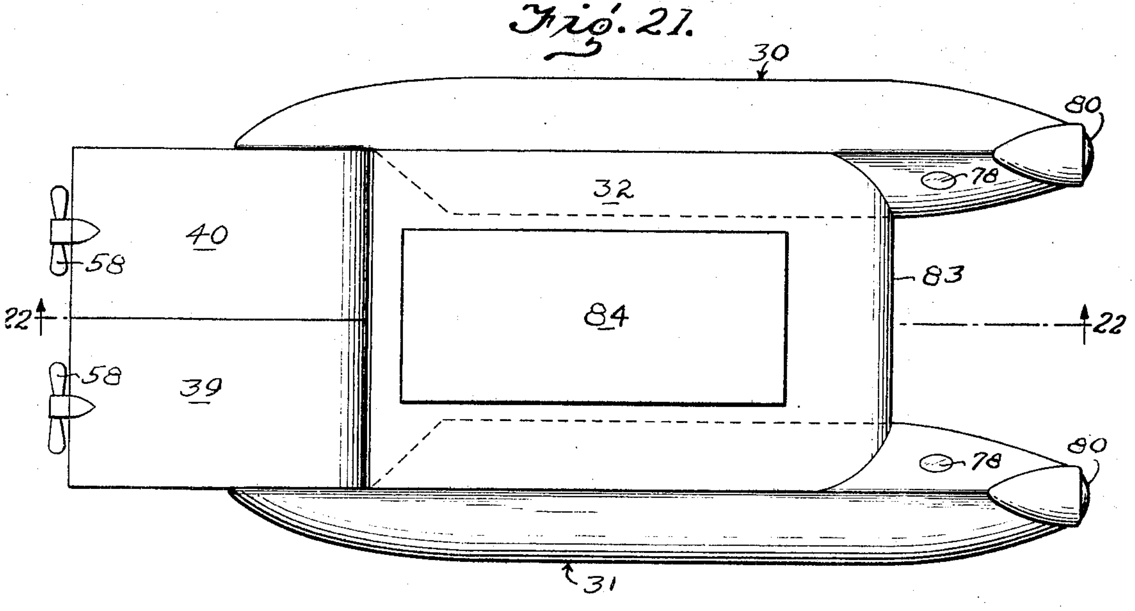
FIG. 21 is a further modification of the water craft of the present invention, wherein the two forward power pods have been omitted, leaving the aft power pods in assistance. This will retard the maneuvering of the craft considerably, but for certain military applications, this design might be applicable, particularly in view of costs.
Figure 22:
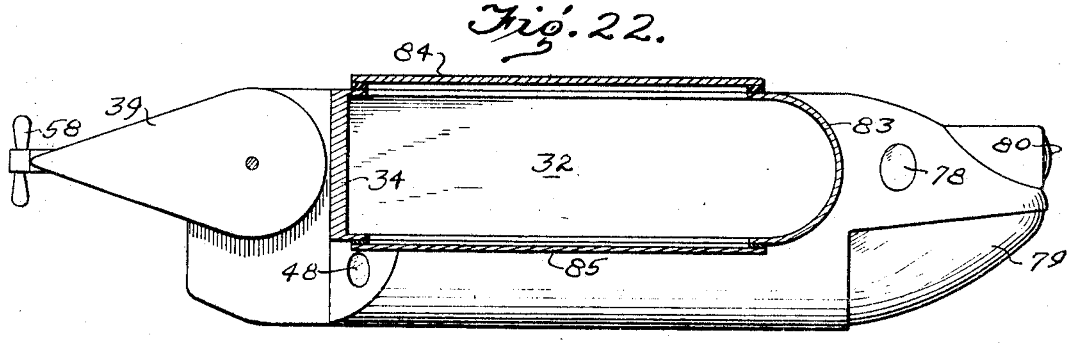
FIG. 22 is a longitudinal section taken on the line 22—22 of FIG. 21.
Figure 23:
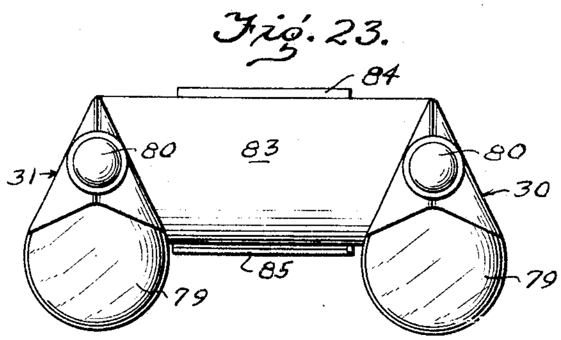
FIG. 23 is a front elevational view of the modification shown in FIGS. 21 and 22.

FIGS. 21, 22 and 23 show a modification which presents a simplified version of the demolition unit or submarine chaser shown in FIGS. 17 through 20. In this case, two forward power pods have been omitted, leaving the aft power pods 39 and 40. This will retard the maneuvering of the craft considerably, but the cost of the craft will be much lower, and for certain applications in naval or military practice, this design might be applicable. The forward end of the central hull section is rounded as at 83. Simplified hatches are used, and there is shown a single top hatch 84 and a single bottom hatch 85. Any suitable means may be used for fastening these hatches in place.

Figure 24:
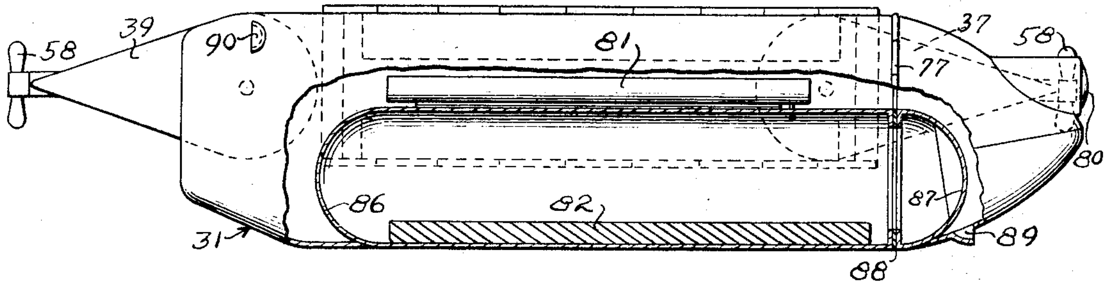
FIG. 24 is a side elevational view, partly broken away, of a further modification which is particularly adapted to be used as a demolition unit, and which is designed for maximum depth of submersion.
Figure 25:
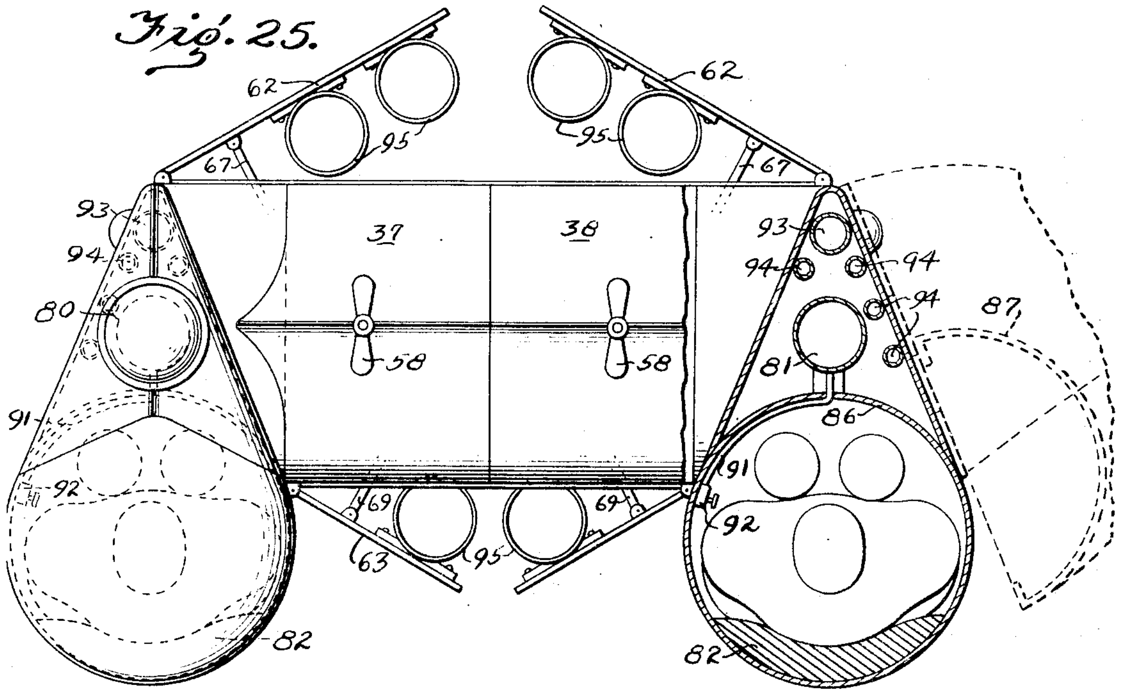
FIG. 25 is a front elevational view of the modification shown in FIG. 24, showing the top and bottom hatches in open position, and showing torpedo tubes which are detachably supported on the hatches.

FIGS. 24 and 25 show a further modification of the type of demolition unit or submarine chaser that is shown in FIGS. 17, 18, 19 and 20. In this case the structure is modified to permit operation of the craft at a maximum depth of submersion. In addition to the basic assembly described in connection with FIGS. 17 through 20, each of the pontoons 30 and 31 is provided with a high pressure capsule 86. The pressure capsule will have a rounded hinged head 87 which is fixedly attached to the nose portions 74 and 75. The said rounded hinged head of the pressure cap will be so positioned that when the nose portion 74 or 75 is closed and locked, the said head 87 will be in sealed relation with the main body 86 of the capsule. A suitable sealing element 88 may be interposed between the head 87 and the pressure capsule body 86. In each of the pontoons outside of the pressure capsule, there are provided forward vent openings 89 and rear vent openings 90. As in the previous modification, each of the pontoons is provided with a reserve air supply tank 81. A suitable conduit 91 leads from the tank 81 and terminates in a valve 92. Installed in the head 87 will be a control panel, not shown, from which overall control of the operation of the vessel may take place.

By using high pressure capsules for individuals within the pontoons, it is then possible to take on ballast of sea water, oil or any other material which might bring about the proper weight and balance desirable under a specific application. The control lines for the power pods and motors, as well as the control lines to working components in the midsection of the hull are carried through tube-like structures 93 and 94, shown above the pressure chambers within the pontoon. Lines of the size and nature needed to do these specific jobs will withstand maximum pressures under the sea. Aside from the flood arrangements within the pontoons and the central hull section to bring about the desired buoyancy and ballast characteristics, it is possible to equalize the pressure within the pontoons and the central hull section to that of the surrounding area through vents 89 and 90. Thus, for example, at a 2,000 foot depth, the pressure in the central hull section and in the pontoons surrounding the pressure capsule may be brought to the same pressure as the water surrounding the craft. Thus, the shell of the pontoon and the shell of the central hull section may be constructed of materials like fiberglass, since these elements will not have to stand maximum pressure. Pressurizing of the power pod for extreme depth does not present any serious problem, since they may be substantially braced and since the design of the motors and fuel container by their very nature will be able to withstand pressures.

In the view shown in FIG. 25, the hinged top hatches 62 and the hinged bottom hatches 63 are provided with a plurality of detachable torpedo tubes 95. When the hatches have been opened as shown, the torpedoes can be fired therefrom at extreme depths, since the tubes themselves will have equalized pressures around them. In this type of construction, the initial thrust requirement to discharge a torpedo is heavily reduced, since the torpedo does not have to overcome exterior pressures as in the conventional submarine torpedo tube installation.

FIG. 26 shows a fragmentary view of a pressure capsule which is designed for extreme depths. In this case, the size of the vessel will be increased so that the pontoons contain high pressure spheres 96 of steel, aluminum or alloy construction. These spheres can be so arranged within the pontoons to bring about balance and can be connected by a series of high pressure tubes 97, permitting transportation or movement from one sphere to the other by the operating personnel. In the case of the capsules, as well as the spheres, it is proposed to install a power charged mechanism which would dispatch the capsules or spheres from the craft while the vessel was completely submerged, in the event that power failure would prohibit the craft from resurfacing.

It may be pointed out that the modification disclosed in FIGS. 13 and 14 would have maximum utility as a hydrophone tender, being used for surveying, installation, maintenance and repair of underwater systems. The central hull section may be of sufficient size to accommodate complete shop facilities and equipment storage facilities. In use at maximum depths, which might be required for installation, maintenance and repair, the central hull section can be pressurized, to match surrounding water area, permitting the bottom of the hull to be opened fully to the sea for dispatching or taking on hydrophone equipment. After taking on the equipment, the craft may be surfaced, and by decompressing the central hull section, personnel will be able to enter the section for repairs and maintenance of the equipment. Under normal operating conditions, the personnel would not be in the midsection or center hull section.

In cases where pressure requirements demand, the top and bottom decks and hatches may be made curved for additional strength.

While there is herein shown and described the preferred embodiments of the invention, it is nevertheless to be understood that minor variations may be made therein without departing from the spirit and scope of the invention as claimed.

This is a refiling of the original application of the same applicant S.N. 11,239 filed Feb. 26, 1960 for Watercraft, and now abandoned.

What is claimed is:

1. In a submersible water craft, a pair of spaced watertight pontoons, a central hull section connecting said pontoons,
said section having fore and aft end walls and top and bottom decks and forming a watertight compartment separate from the pontoons,
horizontally disposed, water sealed power pods, each pivotally connected at one end to the craft adjacent said aft end wall for pivotal movement through a vertical angle in either direction transversely of the planes of said top and bottom decks,
said power pods having arcuate inner ends and upper and lower control surfaces,
means at the free ends of said power pods for exerting a forward or reverse power thrust, and
means in said water craft for moving each of said pods to a selected angle.

2. In a submersible water craft, the combination as defined in claim 1,
there being one pair of said horizontally disposed water sealed power pods pivotally connected to said craft adjacent said aft end wall, and
a second pair of horizontally disposed water sealed power pods each pivotally connected to said craft adjacent said fore end wall.

3. In a water craft, the combination defined in claim 1, and
guard plates connected to said central hull section,
said plates being spring biased into engagement with the top and bottom surfaces of said power pods to cover the openings between the arcuate inner ends of said power pods and the central hull section,
said plates retracting to permit movement of said power pods to extreme positions.

4. In a water craft, a pair of spaced watertight pontoons,
a central hull section connecting said pontoons,
said central hull section having fore and aft end walls and top and bottom decks,
a plurality of power pods pivotally connected at their inner ends adjacent said end walls for independent movement through an angle in a direction normal to the plane of said top and bottom decks,
each of said power pods being tear drop shaped in longitudinal section,
said longitudinal section being uniform throughout the width of said power pods.

5. In a water craft, the combination as defined in claim 4,
there being a pair of power pods pivotally connected at their inner ends to said craft adjacent at least one of said end walls for independent pivotal movement in a direction normal to the plane of said top and bottom decks, and
independent power control means in said water craft for setting the angle of each of said power pods.

References Cited

UNITED STATES PATENTS

| | | | |
|---|---|---|---|
| 1,510,283 | 9/1924 | Lake | 114—61 |
| 2,984,845 | 5/1961 | Gregoire | 114—61 X |

ANDREW H. FARRELL, Primary Examiner

U.S. Cl. X.R.

115—38